United States Patent
Pornin

(10) Patent No.: US 9,146,384 B2
(45) Date of Patent: Sep. 29, 2015

(54) OPTICAL SYSTEM FOR FORMING AN IMAGE ON A CONCAVE SPHERICAL SURFACE

(75) Inventor: Cyrille Pornin, Crolles (FR)

(73) Assignee: Commissariat à L'énergie Atomique et aux Énergies Alternatives, Paris (FR)

(*) Notice: Subject to any disclaimer, the term of this patent is extended or adjusted under 35 U.S.C. 154(b) by 99 days.

(21) Appl. No.: 13/883,166

(22) PCT Filed: Oct. 28, 2011

(86) PCT No.: PCT/FR2011/052542
§ 371 (c)(1),
(2), (4) Date: Jan. 10, 2014

(87) PCT Pub. No.: WO2012/059676
PCT Pub. Date: May 10, 2012

(65) Prior Publication Data
US 2014/0300976 A1    Oct. 9, 2014

(30) Foreign Application Priority Data
Nov. 2, 2010 (FR) ...................................... 10 58991

(51) Int. Cl.
*G02B 3/02* (2006.01)
*G02B 13/18* (2006.01)
(Continued)

(52) U.S. Cl.
CPC *G02B 13/18* (2013.01); *G02B 9/16* (2013.01); *G02B 13/003* (2013.01); *G02B 13/006* (2013.01)

(58) Field of Classification Search
CPC ....... G02B 13/18; G02B 13/0035; G02B 3/04
USPC ................................................ 359/708, 716
See application file for complete search history.

(56) References Cited

U.S. PATENT DOCUMENTS

| 4,467,361 A | 8/1984 | Ohno et al. |
| 5,125,064 A | 6/1992 | Naselli et al. |

(Continued)

FOREIGN PATENT DOCUMENTS

| EP | 1132967 A2 | 9/2001 |
| JP | 2003215446 | 7/2003 |

(Continued)

OTHER PUBLICATIONS

Zoberbier, et al., "Wafer-Level Cameras—Novel Fabrication and Packaging Technologies," The International Image Sensor Workshop, 2009, Bergen, Norway.

(Continued)

*Primary Examiner* — James Greece
(74) *Attorney, Agent, or Firm* — Kevin R. Erdman; Brannon Sowers & Cracraft PC

(57) ABSTRACT

The invention relates to an optical system for forming and image on a concave spherical surface comprising, perpendicularly to the optical axis of the spherical surface, starting from the object side: a first elliptical plano-complex lens (L1) with convexity direct towards the object side; a second aspherical plano-concave lense (L2) whose radius of curvature decreases with distance from the axis, with concavity directed towards the image side, made of a material with a smaller Abbe number that that of the first lens; a parallel-faced plate (S1) on which bear the planer faces of the first and second lenses; a third aspherical plano-convex/concave lens (L3) exhibiting a convex shape in its central part and a concave shape at its periphery.

17 Claims, 2 Drawing Sheets

(51) Int. Cl.
*G02B 9/16* (2006.01)
*G02B 13/00* (2006.01)

(56) References Cited

U.S. PATENT DOCUMENTS

| | | |
|---|---|---|
| 5,153,778 A | 10/1992 | Sasian-Alvarado |
| 6,486,917 B2 | 11/2002 | Iwasaki |
| 6,556,349 B2 | 4/2003 | Cox |
| 6,909,554 B2 | 6/2005 | Liu et al. |
| 6,985,184 B2 | 1/2006 | Sato |
| 7,180,687 B2 | 2/2007 | Sato |
| 7,332,733 B2 | 2/2008 | Jorritsma et al. |
| 7,436,605 B2 | 10/2008 | Asami |
| 7,486,328 B2 | 2/2009 | Sato et al. |
| 7,492,534 B2 | 2/2009 | Hatade et al. |
| 7,688,531 B1 * | 3/2010 | Deng et al. .................... 359/811 |
| 7,944,627 B2 | 5/2011 | Sakagami |
| 8,184,383 B2 | 5/2012 | Shinohara |

FOREIGN PATENT DOCUMENTS

| | | |
|---|---|---|
| WO | 2008/011003 A2 | 1/2008 |
| WO | 2009/061519 A1 | 5/2009 |

OTHER PUBLICATIONS

European Patent Office, International Search Report, May 6, 2012.
European Patent Office, International Preliminay Report on Patentability, May 8, 2013.

* cited by examiner

OPTICAL SYSTEM FOR FORMING AN IMAGE ON A CONCAVE SPHERICAL SURFACE

CROSS-REFERENCE TO RELATED APPLICATIONS

The present application is a U.S. National Stage Patent Application of International Patent Application Serial Number PCT/FR2011/052542, filed Oct. 28, 2011, which claims priority under 35 U.S.C. §119 of French Patent Application Serial Number 10/58991, filed Nov. 2, 2010, the disclosures of which are incorporated by reference herein.

BACKGROUND OF THE INVENTION

1. Field of the Invention

The present invention relates to an optical system capable of forming an image on a concave spherical surface. It especially applies to the case where the concave spherical surface comprises a pixel array capable of forming the detector of a digital image capture device, for example usable in a portable device.

2. Description of the Related Art

As illustrated in FIG. 1, when a lens 1 is used, parallel axial rays 3 form an image focused at a point F located on an image plane 5. However, if the field aperture is large, non-axial rays 7 cannot be considered to focus on a focal plane. Instead of this, these non-axial rays focus at points, such as point F', located on a focusing surface 9 which generally is a sphere portion.

If it is desired for the image to effectively form on a planar focal surface, a complex optical system such as that described, for example, in U.S. Pat. No. 7,180,687, which comprises a lens comprising six complex aspherical lens surfaces for correcting irregular curvatures of the field, and the various aberrations and distortions inherent to an optical system.

An image capture system in which the image is formed on a concave spherical surface has been provided, for example, in U.S. Pat. No. 4,467,361. This system essentially comprises a ball lens. A disadvantage of such ball lenses, in addition to the fact that they provide a poor correction of distortions, is that their manufacturing is incompatible with collective methods developed to manufacture lenses by deposition of a layer on a transparent plate, and simultaneous forming of a large number of identical lenses by molding, assembly, and cutting into individual lenses. Such collective methods are for example described in a document entitled "wafer-level cameras" by Margaret Zoberbier et al. disclosed at the International Image Sensor Workshop, Bergen, Norway 2009.

U.S. Pat. No. 7,688,531 describes a system for forming images on a planar surface and essentially aims at performing astigmatism corrections, but does not concern field curvature aberrations.

Thus, known systems have various disadvantages.

SUMMARY OF THE INVENTION

An object of embodiments of the present invention is to overcome the disadvantages of known systems and more specifically to provide a lens capable of forming an image on a concave spherical surface, corrected of the various aberrations and distortions inherent to current optical systems by using as little lens surface areas as possible.

Another object of embodiments of the present invention is to provide such a lens that can be manufactured by a collective method of lens manufacturing on transparent plates.

To achieve these and other objects, the present invention provides an optical system for forming an image on a concave spherical surface comprising, perpendicularly to the optical axis of the spherical surface, starting from the object side: a first elliptical plano-convex lens having its convexity turned towards the object side; a second aspherical plano-concave lens having its radius of curvature decreasing with the distance to the axis, having its concavity turned towards the image side, made of a material having an Abbe number smaller than that of the first lens; a parallel plate supporting the planar surfaces of the first and second lenses; and a third aspherical plano-convex/concave having a convex shape in its central portion and a concave shape at its periphery.

BRIEF DESCRIPTION OF THE DRAWINGS

The foregoing and other objects, features, and advantages will be discussed in detail in the following non-limiting description of specific embodiments in connection with the accompanying drawings, among which.

DESCRIPTION OF EMBODIMENTS OF THE PRESENT INVENTION

It will previously be reminded that an optical system designer now currently uses design programs. An example of such a program is program ZEMAX of Zemax Development Corp. sold in Europe by Optima Research Ltd., and available for sale on website www.zemax.com. Another example of optical design assistance tool is program OSLO of Lambda Research Corp.

Program ZEMAX will be here more specifically considered as an example. Program ZEMAX enables, first, when the components of an optical system have been generally provided, to view the wave fronts provided by this optical system. Thus, the designer of an optical system may:

provide an initial optical system containing a determined number of lens surfaces having given general aspects, visualize the wave fronts, adjust various elements of his system, visualize in real time the resulting modifications of the wave fronts, repeat the last two steps to reach an approximate model.

Second, once the approximate model is close to an optimum, software ZEMAX comprises an optimization system which provides exact and accurate parameters of an optimized optical system having a modulation transfer function fulfilling determined criteria. Such criteria correspond to the obtaining of a sharp image where an alternation of black and white lines at a desired period and for a desired field angle can be distinguished with a contrast greater than 50%. It will here be considered that the image is sharp when the "desired period" is on the order of $10\lambda \cdot N$, $\lambda$ being the wavelength of light and $N=f/d$ being the number of apertures of the optical system (f=focal distance and d=diameter of the exit aperture) and the half field angle is on the order of 30°.

However, of course, to be able to obtain an initial model, and then an optimized optical system, the designer should first have provided an approximate optical system that can make the software converge.

Figure 1:
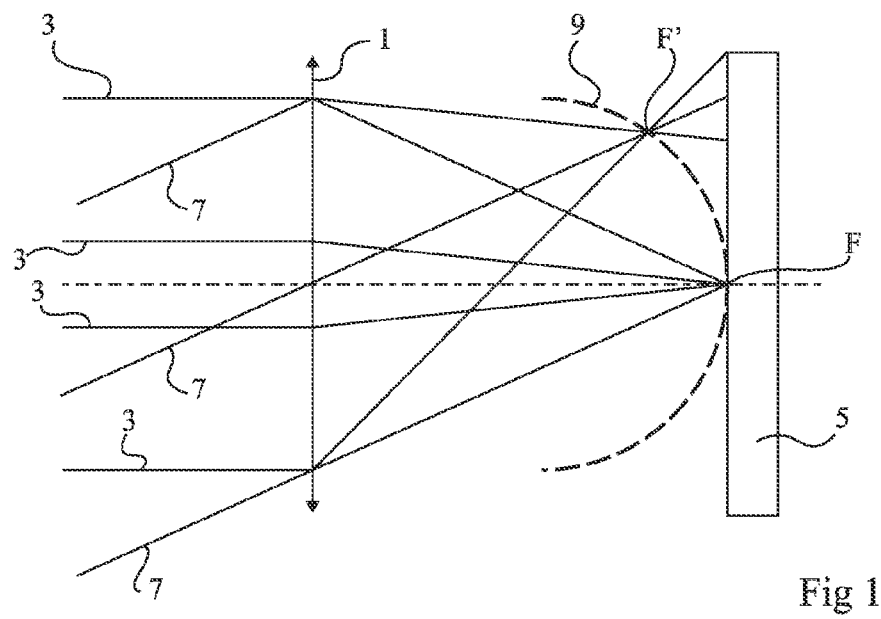
FIG. 1 shows a conventional optical system.
Figure 2:
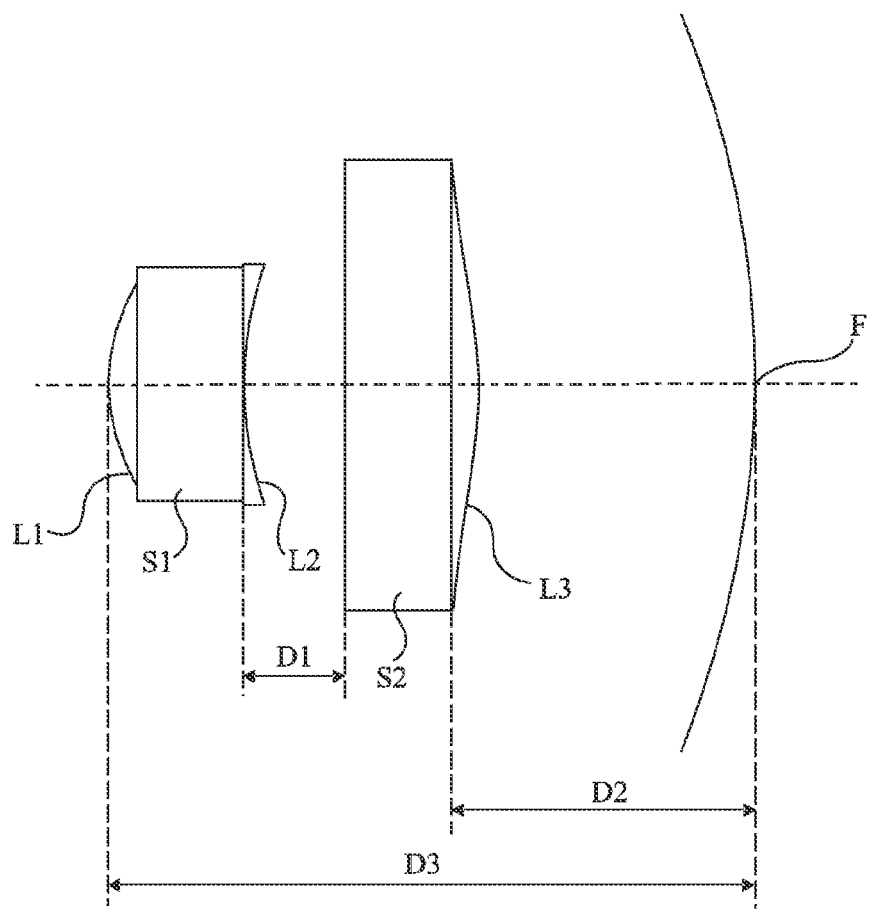
FIG. 2 illustrates an optical system according to an embodiment of the present invention.

In the present case, the inventor provides an optical system with three lenses only such as shown in FIG. 2 to provide a sharp image on a detector formed on a portion of concave focusing sphere. This system comprises a first plano-convex lens L1 and a second plano-concave lens L2 arranged on either side of a transparent plate S1, and a third lens L3 formed on a transparent plate S2. The axial distance between the rear surface of plate S1 and the front surface of plate S2 is equal to D1. The axial distance between the rear surface of plate S2 and the axial focal point is equal to D2. The axial distance between the front surface of lens L1 and axial focal point F is equal to D3.

First lens L1 is an elliptical plano-convex lens, having its convexity directed towards the object side. Second lens L2 is an aspherical plano-convex lens having its radius of curvature decreasing with the distance to the axis, with its concavity facing the image side. Lens L2 is made of a material having an Abbe number different from that of first lens L1 to enable to correct chromatic aberrations.

The association of a converging lens L1 with a diverging lens L2 forms an achromatic doublet (the chromatic aberrations which appear on lens L1 are compensated by lens L2). The spherical aberrations due to L1 are also compensated by L2 due to the sign of their opposite focal distances. The coma aberration is minimized on both lenses due to an aspherization thereof.

Lens L3 enables to control the distortion (image compression or stretching) and corrects the astigmatism (doubling of the focusing surface according to the plane where the light rays propagate). For this purpose, it is also aspherized. It slow curvatures also enable to adjust the focal distance.

Figure 3:
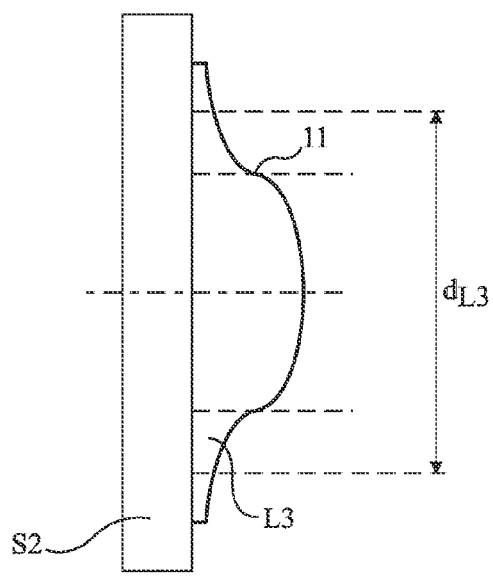
FIG. 3 is a detailed view of an embodiment of one of the lenses of an optical system according to the present invention.

FIG. 3 shows the general shape of third lens L3. Lens L3 is a lens having a planar surface and an aspherical surface with a convex shape in its central portion and a concave shape at its periphery. This lens has an effective aperture dL3. In the cross-section view, an inflexion point 11 separates the convex and concave portions.

Once this fundamental selection of the number, the arrangement, and the shape of lenses L1, L2, L3 has been made, thus defining an initial optical system, those skilled in the art may submit the initial optical system to first simulations in an optical design assistance tool and view the resulting wave fronts.

Figure 4:
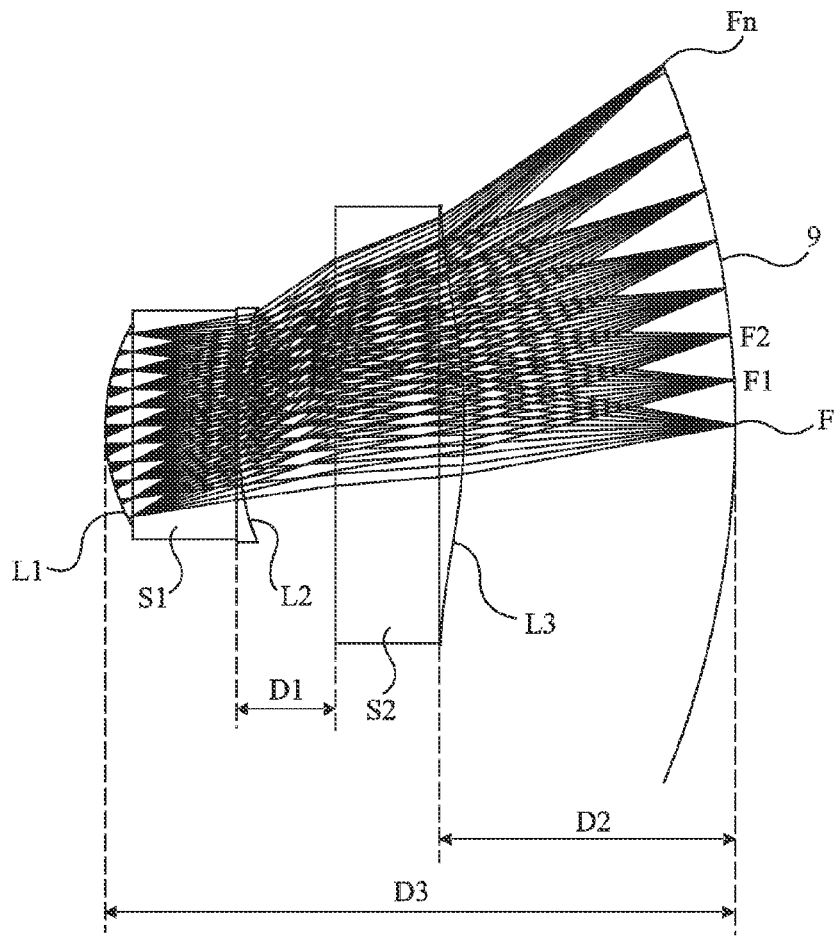
FIG. 4 is a view of a visual display provided by an optical system simulation software such as software ZEMAX.

FIG. 4 shows the image which is obtained on a screen when the device is submitted to a ZEMAX simulation. FIG. 4 corresponds to a finalized device for which the obtained image is effectively well focused on the surface of concave detector 9. In this drawing, point F corresponds to the axial focus and points F1, F2 . . . Fn correspond to successive off-axis focuses corresponding to the various inclinations of the incident beam.

It should be understood that before obtaining the visual display illustrated in FIG. 4, it is started from the initial optical system such as previously defined, where the various beams do not properly converge on the spherical detector. The system designer will successively modify various parameters of the various lenses to obtain this finalization. Due to the ZEMAX program, the variation of the points of convergence may be observed in real time. This simulation leads to a quasi-finalized structure (approximate model) which is submitted to a subsequent optimization program. It should be noted that this completion and this convergence of the program towards the initial model are only possible because a system with three lenses only having the above discussed characteristics has been selected.

For a rotational aspherical lens i of axis z, axial value z can be defined at any point of the surface according to radial distance r by the following expression:

$$z_i(r) = \frac{r^2/R_i}{1+\sqrt{1(1+k_i)(r/R_i)^2}} + A_{i2}r^2 + A_{i4}r^4 + \ldots$$

where $k_i$, $R_i$, and $A_{ij}$ are characteristic parameters of lens i, $k_i$ being a conicity constant, $R_i$ a radius of curvature, and $A_{ij}$ an asphericity coefficient.

After the first optimization operation performed by successive approximations starting from the previously disclosed shapes, and calling f the focal distance of the optical system, a definition of the approximate model of the initial optical system such as disclosed hereafter is obtained. The indicated values are given to within 10%.

lens L1
  radius: R1=0.4*f (convex)
  K1=0.3 (ellipse)
  thickness at the center: set by a minimum edge thickness of 10 μm.
lens L2
  radius: R2=f (concave)
  A24=2.4*f$^{-3}$
  A26=38*f$^{-5}$
  thickness at the center: 10 μm
lens L3
  A32=−0.47*f$^{-1}$
  A34=1.16*f$^{-3}$
  A36=−0.6*f$^{-5}$
  thickness at the center: set by a minimum edge thickness of 10 μm
  the inflexion ring between the convex portion and the concave portion ranges between 0.6 and 0.8 of the value of the useful radius of this lens.
plates S1, S2
  thickness e=0.2*f
  D1=0.18*f
  D2=0.57*f
detector
  radius of curvature: Rc=−1.8*f (concave).

To decrease chromatic aberrations, lens L2 is formed of a material less constringent than that of lenses L1 and L3.

For the following examples, lenses L1 and L3 are made of PMMA (polymethylmethacrylate) and lens L2 is made of PC (polycarbonate). The plates on which the lenses are deposited are made of glass (D263T of Schott).

PMMA has, for a 587.56-nm wavelength, a refraction index Nd equal to 1.4914, and an Abbe number Vd equal to 52.6.

PC has, for a 587.56-nm wavelength, a refraction index Nd equal to 1.5849, and an Abbe number Vd equal to 27.56.

D263T (Schott) has, for a 587.56-nm wavelength, a refraction index Nd equal to 1.5228, and an Abbe number Vd equal to 57.4951.

Three examples of optimization of the approximate model defined hereabove will now be given for three values of focal distance f.

EXAMPLE 1

An optical combination having a 3-mm focal distance is desired. The parameters of the approximate model thus are:

lens L1:
  R1=1.2 mm,
  K1=0.3,
  thickness at the center: set by a minimum edge thickness of 10 μm
lens L2:
  R2=3 mm,
  A24=0.0889 mm$^{-3}$,
  A26=0.156 mm$^{-5}$,
  thickness at the center equal to 10 μm
lens L3:
  A32=−0.157 mm$^{-1}$,
  A34=0.0430 mm$^{-3}$,
  A36=0.00247 mm$^{-5}$,
  thickness at the center set by a minimum edge thickness of 10 μm
plates S1, S2:
  e=0.6 mm,
  D1=0.54 mm,
  D2=1.71 mm
detector:
  Rc=−5.4 mm.

After optimization of the parameters, the following configuration is finally obtained:
  lens L1
  R1=1.213 mm
  K1=0.324
  thickness at the center set by a minimum edge thickness of 10 μm
  lens L2
  R2=3.029 mm
  A24=0.0910 mm$^{-3}$
  A26=0.163 mm$^{-5}$
  thickness at the center: 10 μm
  lens L3
  A32=−0.1582 mm$^{-1}$
  A34=0.0427 mm$^{-3}$
  A36=−0.00248 mm$^{-5}$
  thickness at the center set by a minimum edge thickness of 10 μm
  plates S1, S2
  e=0.6 mm
  D1=0.572 mm
  D2=1.708 mm
  detector
  Rc=−5.432 mm.

EXAMPLE 2

An optical combination having a 1.5-mm focal distance is desired. The parameters of the approximate model thus are:
lens L1:
  R1=0.6 mm,
  K1=0.3,
  thickness at the center set by a minimum edge thickness of 10 μm
lens L2:
  R2=1.5 mm,
  A24=0.711 mm$^{-3}$,
  A26=5.0 mm$^{-5}$,
  thickness at the center equal to 10 μm
lens L3:
  A32=−0.313 mm$^{-1}$,
  A34=0.344 mm$^{-3}$,
  A36=0.079 mm$^{-5}$,
  thickness at the center set by a minimum thickness at the edge of 10 μm
plates S1, S2:
  e=0.3 mm,
  D1=0.27 mm,
  D2=0.855 mm
detector:
  Rc=−2.7 mm.

After optimization of the parameters, the following configuration is finally obtained:
  lens L1
  R1=0.610 mm
  K1=0.302
  thickness at the center set by a minimum edge thickness of 10 μm
  lens L2
  R2=1.540 mm
  A24=0.7176 mm$^{-3}$
  A26=4.878 mm$^{-5}$
  thickness at the center equal to 10 μm
  lens L3
  A32=−0.3154 mm$^{-1}$
  A34=0.3438 mm$^{-3}$
  A36=−0.0662 mm$^{-5}$
  thickness at the center set by a minimum edge thickness of 10 μm
  plates S1, S2
  e=0.3 mm
  D1=0.2834 mm
  D2=0.855 mm
  detector
  Rc=−2.712 mm.

EXAMPLE 3

An optical combination having a 5-mm focal distance is desired. The parameters of the approximate model thus are:
lens L1,
  R1=2 mm,
  K1=0.3,
  thickness at the center: set by a minimum edge thickness of 10 μm
lens L2:
  R2=5 mm,
  A24=0.0192 mm$^{-3}$,
  A26=0.012 mm$^{-5}$,
  thickness at the center: 10 μm
lens L3:
  A32=−0.094 mm$^{-1}$,
  A34=0.00928 mm$^{-3}$,
  A36=0.000206 mm$^{-5}$,
  thickness at the center set by a minimum edge thickness of 10 μm
plates S1, S2:
  e=1 mm,
  D1=0.9 mm,
  D2=2.85 mm
detector:
  Rc=−9 mm.

After optimization of the parameters, the following configuration is finally obtained:
  lens L1
  R1=2.016 mm
  K1=0.333
  thickness at the center set by a minimum edge thickness of 10 μm
  lens L2
  R2=5.015 mm
  A24=0.01975 mm$^{-3}$ A26=0.01301 mm$^{-5}$
thickness at the center equal to 10 μm
lens L3
A32=−0.09501 mm$^{-1}$
A34=0.009208 mm$^{-3}$
A36=−0.0002058 mm$^{-5}$
thickness at the center set by a minimum edge thickness of 10 μm
plates S1, S2
e=0.9 mm
D1=0.957 mm
D2=2.8442 mm
detector
Rc=−9.058 mm.

Specific embodiments of the present invention have been described. Various alterations, modifications, and improvements will readily occur to those skilled in the art.

The invention claimed is:

1. An optical system for forming an image on a concave spherical surface comprising, perpendicularly to the optical axis of the spherical surface, starting from the object side:
    a first elliptical plano-convex lens, having a convexity turned towards the object side;
    a second aspherical plano concave lens having a radius of curvature decreasing with the distance to the axis, with the concavity of the second lens turned towards the image side, made of a material having an Abbe number smaller than that of the first lens;
    a parallel plate supporting the planar surfaces of the first and second lenses; and
    a third aspherical plano-convex/concave lens having a central portion with a convex shape, defining a convex portion, and a periphery with a concave shape, defining a concave portion;
    wherein the optical system captures the image and forms the image on the concave spherical surface.

2. The optical system of claim 1, further comprising:
    an inflexion ring, wherein the inflexion ring is disposed between the convex portion and the concave portion of the third lens ranges between 0.6 and 0.8 of the value of the useful radius of the third lens.

3. The optical system of claim 1, wherein the first and third lenses are made of PMMA (polymethylmethacrylate) and the second lens is made of PC (polycarbonate), the plates having the lenses deposited thereon being made of glass.

4. An optical system for forming an image on a concave spherical surface comprising, perpendicularly to the optical axis of the spherical surface, starting from the object side:
    a first elliptical plano-convex lens, having a convexity turned towards the object side;
    a second aspherical plano-concave lens having a radius of curvature decreasing with the distance to the axis, with the concavity of the second lens turned towards the image side, made of a material having an Abbe number smaller than that of the first lens;
    a parallel plate supporting the planar surfaces of the first and second lenses; and
    a third aspherical plano-convex/concave lens having a central portion with a convex shape, defining a convex portion, and a periphery with a concave shape, defining a concave portion;
    wherein the optical system captures the image and forms the image on the concave spherical surface;
    wherein the elements are characterized, to within 10%, by the following parameters:
    the first lens
        $R_1$=0.4*f (convex)
        $K_1$=0.3 (ellipse)
        thickness at the center: set by a minimum edge thickness of 10 μm.
    the second lens
        $R_2$=f (concave)
        $A_{24}$=2.4*f$^{-3}$
        $A_{26}$=38*f$^{-5}$
        thickness at the center: 10 μm
    the third lens
        $A_{32}$=−0.47*f$^{-1}$
        $A_{34}$=1.16*f$^{-3}$
        $A_{36}$=−0.6*f$^{-5}$
        thickness at the center: set by a minimum edge thickness of 10 μm.
    the parallel plate and a second plate (the third lens being supported by the second plate)
        e=0.2*f
        D1=0.18*f
        D2=0.57*f
    detector
        $R_c$=−1.8*f (concave)
    wherein f designates the focal distance of the optical system and where parameters R, A, and K correspond to the definition of the shape of a lens provided by the following equation:

$$z_i(r) = \frac{r^2/R_i}{1+\sqrt{1(1+k_i)(r/R_i)}^2} + A_{i2}r^2 + A_{i4}r^4 + \ldots$$

wherein $k_i$, $R_i$, and $A_{ij}$ are characteristic parameters of lens i, $k_i$ being a conicity constant, $R_i$ a radius of curvature, and $A_{ij}$ an asphericity coefficient.

5. The optical system of claim 1, wherein each of the first, second, and third lenses are formed on plates, assembled in individual cut-out lenses.

6. The optical system of claim 4, further comprising:
    an inflexion ring, wherein the inflexion ring is disposed between the convex portion and the concave portion of the third lens ranges between 0.6 and 0.8 of the value of the useful radius of the third lens.

7. The optical system of claim 4, wherein the first and third lenses are made of PMMA (polymethylmethacrylate) and the second lens is made of PC (polycarbonate), the plates having the lenses deposited thereon being made of glass.

8. The optical system of claim 4, wherein each of the first, second, and third lenses are formed on plates, assembled in individual cut-out lenses.

9. An optical system for forming an image on a concave spherical surface comprising, perpendicularly to the optical axis of the spherical surface, starting from the object side:
    a first elliptical plano-convex lens, having a convexity turned towards the object side;
    a second aspherical plano-concave lens having a radius of curvature decreasing with the distance to the axis, with the concavity of the second lens turned towards the image side, made of a material having an Abbe number smaller than that of the first lens; and
    a third aspherical plano-convex/concave lens having a central portion with a convex shape, defining a convex portion, and a periphery with a concave shape, defining a concave portion;
    wherein the optical system captures the image and forms the image on the concave spherical surface; and
    wherein the elements are characterized, to within 10%, by the following parameters:

the first lens
- $R_1 = 0.4*f$ (convex)
- $K_1 = 0.3$ (ellipse)
- thickness at the center: set by a minimum edge thickness of 10 μm.

the second lens
- $R2 = f$ (concave)
- $A_{24} = 2.4*f^{-3}$
- $A_{26} = -38*f^{-5}$
- thickness at the center: 10 μm the third lens
- $A_{32} = -0.47*f^{-1}$
- $A_{34} = 1.16*f^{-3}$
- $A_{36} = -0.6*f^{-5}$
- thickness at the center: set by a minimum edge thickness of 10 μm wherein f designates the focal distance of the optical system and where parameters R, A, and K correspond to the definition of the shape of a lens provided by the following equation:

$$z_i(r) = \frac{r^2/R_i}{1 + \sqrt{1(1+k_i)(r/R_i)^2}} + A_{i2}r^2 + A_{i4}r^4 + \ldots$$

wherein $k_i$, $R_i$, and $A_{ij}$ are characteristic parameters of lens i, $k_i$ being a conicity constant, $R_i$ a radius of curvature, and $A_{ij}$ an asphericity coefficient.

10. The optical system of claim 9, further comprising: an inflexion ring, wherein the inflexion ring is disposed between the convex portion and the concave portion of the third lens ranges between 0.6 and 0.8 of the value of the useful radius of the third lens.

11. The optical system of claim 9, wherein the first and third lenses are made of PMMA (polymethylmethacrylate) and the second lens is made of PC (polycarbonate).

12. The optical system of claim 9, wherein each of the first, second, and third lenses are formed on plates, assembled in individual cut-out lenses.

13. The optical system of claim 9, further comprising:
a parallel plate supporting the planar surfaces of the first and second lenses.

14. The optical system of claim 13, wherein the elements are further characterized, to within 10%, by the following parameters:
the parallel plate and a second plate (the third lens being supported by the second plate)
- $e = 0.2*f$
- $D1 = 0.18*f$
- $D2 = 0.57*f$.

15. The optical system of claim 9, wherein the elements are further characterized, to within 10%, by the following parameters:
detector
- $R_c = -1.8*f$ (concave).

16. The optical system of claim 9, wherein the plates having the lenses deposited thereon are made of glass.

17. The optical system of claim 9, wherein each of the first, second, and third lenses are formed on plates and are assembled in individual cut-out lenses.

* * * * *